Feb. 1, 1966   O. C. NIEDERER ET AL   3,232,413
EGG CANDLER

Filed June 28, 1963   2 Sheets-Sheet 1

INVENTORS
OTTO C. NIEDERER
HERBERT O. NIEDERER

BY Albert Sperry

ATTORNEY

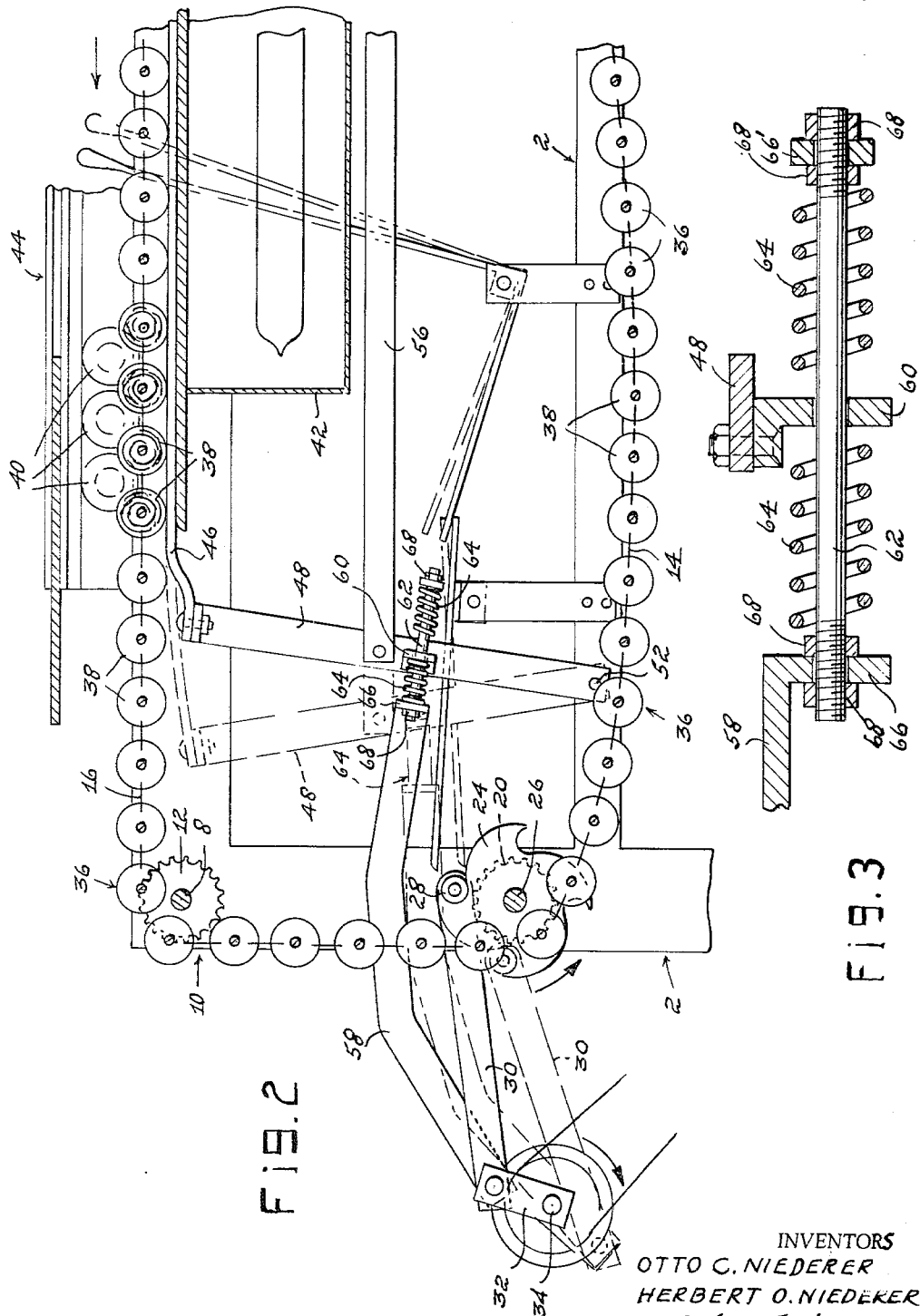

United States Patent Office 3,232,413
Patented Feb. 1, 1966

3,232,413
EGG CANDLER
Otto C. Niederer, Bear Tavern Road, and Herbert O.
Niederer, Church Road, both of Titusville, N.J.
Filed June 28, 1963, Ser. No. 291,348
3 Claims. (Cl. 198—33)

This invention relates to egg candling equipment and is directed particularly to constructions for moving and rotating eggs when candling the same.

This application is a continuation-in-part of applicant's copending application Serial No. 201,890 filed June 12, 1962.

Egg candling equipment have heretofore been constructed and arranged to rotate eggs intermittently so that when presented over a source of illumination, the yolk and white of the egg will continue to rotate within the illuminated shell. In this way, blood spots located on the far side of the yolk and other hard spots or imperfections in the eggs are brought into view and are seen to move within the egg so that the presence of any such defect can be readily noted.

Egg candling equipment constructed for such operation generally embody a plurality of spools, rollers, springs or other egg-supporting means which are arranged in spaced parallel relation transversely of a conveyor by which a large number of eggs can be moved past a source of light for candling several eggs or rows of eggs at a time. The spools, rollers, springs or the like are then rotated intermittently or in reverse directions to cause the yolk to rotate within the shell of the egg while the egg is illuminated. However, in some instances, the manner in which such rotation is effected is so abrupt or jerky as to cause the membrane adjacent the shell of an egg to be torn away from the shell or ruptured and, in some instances, the yolk may be so separated or disconnected from the white of the egg as to allow the yolk to settle to one side of the egg when the egg is at rest. Eggs which have been damaged in this manner cannot be used in hatcheries and are no longer of the perfect quality they might appear to be at the time they were candled.

In accordance with the present invention, these objections to prior egg candling equipment wherein the eggs are rotated and moved in candling eggs are overcome and means are provided which serve to initiate and terminate the rotation of the eggs in a gradual or gentle manner so as to avoid injury to the eggs during the candling operation. Moreover, the movement and rotation of the eggs is such as to allow the eggs to remain stationary for a short period of time after they have been rotated whereby the eggs may be inspected while stationary instead of being presented as a continuously moving group of eggs for observation. In this way, the accuracy of the candling operation can be improved and the speed at which eggs may be candled can be increased.

Accordingly, the principal objects of the present invention are to improve the quality and speed of egg candling operations, to avoid injury to eggs due to sudden, jerky or abrupt movements and rotation of eggs being candled, to provide for the gentle, gradual initiation of an egg rotating movement, and to permit the inspection of eggs while they are held stationary although the yolk and white of the eggs rotate within the eggs.

These and other objects and features of the present invention will appear from the following description thereof wherein reference is made to the figures of the accompanying drawings.

In the drawings:

FIG. 2 is an enlarged view illustrating a detail of the equipment shown in FIG. 1; and FIG. 3 is a further enlarged view of a detail of the construction illustrated in FIGS. 1 and 2.

Figure 1:
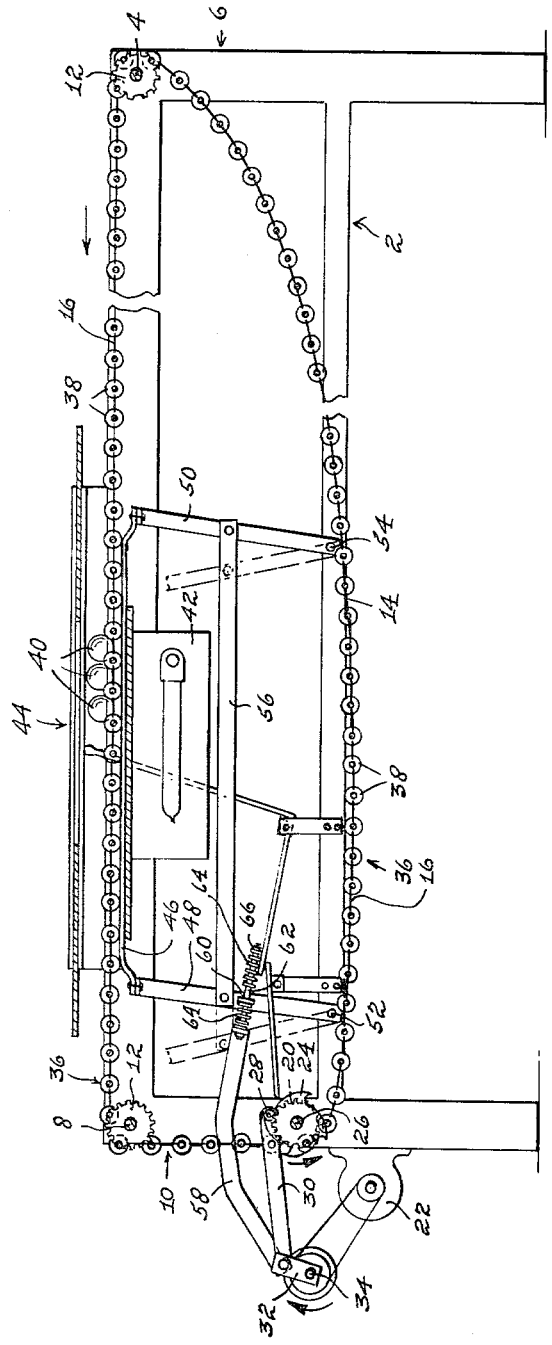
FIG. 1 is a side elevation of typical egg candling equipment embodying the present invention.

In that form of the invention chosen for purposes of illustration in the drawings, the egg candling equipment is of the general type shown and described in copending application Serial No. 201,890. Thus, the equipment has a frame 2 having a shaft 4 rotatably mounted near the loading end 6 of the equipment and a shaft 8 rotatably supported on the frame 2 near the discharge end 10 of the equipment. Each of the shafts 4 and 8 has a sprocket 12 located near the side of the frame and a conveyor chain 14 passes about the sprockets and presents an upper run 16 movable in a direction from the loading end 6 to the discharge end 10 of the equipment.

The conveyor chain 14 is driven by a sprocket 20 which is actuated by a motor 22. As shown, the sprocket 20 is preferably rotated step by step by means of a ratchet wheel 24 secured to the drive shaft 26 on which the sprocket 20 is fixedly mounted. A pawl 28 engages the ratchet wheel 24 and is carried by an arm 30 movable by the crank 32 with the drive shaft 34 by the motor 22. The crank is movable in a clockwise direction, as seen in FIGS. 1 and 2, so that the pawl 28 engages the teeth of the ratchet 24 to rotate the sprocket 20 and advance the upper run 16 of the conveyor 36 step by step to the left, as seen in FIGS. 1 and 2 from the loading end 6 of the equipment to the discharge end 10 thereof.

The conveyor 36 is preferably of the type shown and described in copending application Serial No. 170,768, now Patent No. 3,148,761, but may be of any suitable or preferred type wherein egg supporting members 38 carried by the conveyor are rotatable to rotate eggs 40 suppoted thereby. Further, as shown, a light box 42 is positioned beneath the upper run 16 of the conveyor at the candling station 44 and serves to illuminate the eggs carried by the conveyor for candling purposes.

In order to aid in candling the eggs, the equipment is provided with means for rotating the egg supporting members 38 and the eggs 40 as they approach the candling station 44 and are brought into position over the light box 42. In this way, the yolk and white of the egg are caused to turn within the illuminated shell of the egg so that all sides thereof will be presented to the operator for inspection. As shown in FIGS. 1 and 2, such rotation is effected by providing fabric or other belts or strips of material 46 which may be moved longitudinally of the frame beneath and in contact with the rotatable egg supporting members 38. The opposite ends of the webs or strips of material 46 are secured to arms 48 and 50 which are pivotally movable about pivots 52 and 54 suitably mounted on the frame. The arms are connected by a bar 56 and are caused to oscillate back and forth together by means of a driving link 58 which is secured at one end to the crank member 34 rotatable with the drive shaft 34.

In order to assure gentle rotation of the egg supporting members and relatively gradual initial rotary movement thereof, the driving link 58 is connected to the arm 48 for actuating the webs 46 by yieldable means which may afford lost motion between the driving link and arm 48. As shown, the arm 48 is provided with an outwardly extending bracket 60 having an opening therethrough through which a rod 62 secured to outwardly turned end 66 of the driving link 58 extends. Rod 62 thus constitutes, in effect, an extension of the link 58 sliding in bracket 60. Springs 64 surround the rod 62 on the driving link 58 and are positioned on opposite sides of the bracket 60 on the arm 48. The outer ends of the springs 64 are engageable with the end 66 of link 58 and with an abutment piece 66' which are held in place by nuts 68 on the rod 62. The adjacent ends of the springs 64 are engageable with the bracket 60 on the arm 48 as the arm is rocked back and forth about its pivot 52 by the driving link 58. However, the springs 64 are preferably shorter than the distance between the bracket 60 and the abutments at the outer ends of the springs when the bracket is in a central position between the springs as shown in FIG. 3. In this way, a lost motion connection is provided with a yielding connection between the driving link and arm 48 as the arm moves from one limiting position to another.

With this construction, the action of the webs of material 46 in rotating the egg supporting members 38 is cushioned so as to afford a relatively gradual initial rotation of the egg supporting members and eggs as the spring 46 engages the bracket 60 on arm 48 as the arm moves in one direction and a similar gradual initiation of rotation of the egg supporting members as the arm 48 is rocked in the opposite direction.

The driving link 58, by which the arm 48 is moved, and the arm 30, by which the pawl 28 is moved to rotate ratchet wheel 24, are both connected to the crank 32 on drive shaft 34. Therefore, the movement of arm 30 to the left, as seen in FIG. 2, to advance the conveyor 36 to the left is timed to coincide with the movement of the arm 48 to the left. The conveyor and the egg rotating strips of material 46 then both move in the same direction and, if desired, they may both be moved at approximately the same speed so that the eggs on the egg supporting members of the conveyor will remain substantially stationary. However, if desired, the eggs may be rotated relatively slowly in either direction by suitably varying the length of the arm 48 and the size of the sprocket 20 by which the conveyor is advanced. On the other hand, when the arm 48 moves to the right, the pawl 28 will ride idly over the ratchet teeth whereby the conveyor will remain stationary while the strips of material 46 move to the right as shown in FIGS. 1 and 2. The strips of material 46 will then serve to rotate the egg supporting members 38 in a counterclockwise direction and the eggs positioned over the light box 42 will rotate in a clockwise direction to allow inspection of all sides of the eggs and to rotate the yolk and whites of the eggs within the illuminated egg shells.

While the rotation of the eggs and egg supporting members is thus effected, the initial movement of the link 58 in either direction will leave arm 48 idle at first, followed by gradual movement thereof, due to the spacing of the springs 64 from the bracket 60 and the yielding of the springs 64 due to compression of the springs. The spring compression occurs because the means for rotating the egg supporting members 38 (comprising arms 48 and 50, webs 46, and bar 56) resists initial movement by link 58 until the springs compress sufficiently to overcome the resistance. The desired gradual and gentle initial rotation of the eggs being graded is thereby assured and injury thereto is prevented. As a result, the quality of the eggs is not impaired as an incident to the candling operation and the speed at which the eggs may be candled is increased.

While the lost motion and yielding connection illustrated for insuring the desired character of rotation of the eggs is preferred, various other and alternative constructions and mechanical movements operable to insure gradual initial rotation of the eggs being candled may be employed. It should, therefore, be understood that the particular embodiments of the invention shown in the drawings and described above are intended to be illustrative only and are not intended to limit the scope of the invention.

We claim:

1. In egg candling equipment including rotatable egg supporting members and reciprocating means for rotating said egg supporting members, an arm connected to said reciprocating means and pivotally moveable to actuate the same and a crank connected to the arm for actuating the same, the combination of springs in the connection between said crank and arm for effecting gradual initial movement of said reciprocating means and gradual initial rotation of said egg supporting members in opposite directions, the springs in said connection being compression springs and being in an uncompressed condition with an open space in the connection at least at one end of the springs, thus to produce lost motion between the crank and arm when the crank is operated to actuate the arm, the resistance of the arm and reciprocating means to movement by the crank being of a value selected to require compression of the springs following said lost motion as the crank continues its movement in an arm-actuating direction, said resistance value being effective to produce a progressive increase in the spring compression until the resistance is ultimately overcome and said arm and reciprocating means are actuated to rotate the egg supporting members.

2. In egg candling equipment, the combination of a support frame, a plurality of egg supporting members mounted thereon for rotation in opposite directions, means supported on the frame for reciprocating motion and engaged with said members for rotating the same in opposite directions when reciprocated, an arm pivotally attached to the frame and connected to said means for reciprocating the same responsive to rocking movement of the arm in opposite directions, drive means on the frame including a driving link for rocking the arm, and a resilient yielding connection between the link and arm including an extension of the link slidably supported intermediate its ends by the arm and having abutments at opposite sides of the arm, said connection further including compression springs carried by the extension at opposite sides of the arm, said reciprocating means having a resistance to movement by the arm effective to progressively compress the springs between the arm and abutments to an extent effective to overcome said resistance and thereby impart an initially gradual movement to said arm and reciprocating means.

3. In egg candling equipment, the combination of a support frame, a plurality of egg supporting members mounted thereon for rotation in opposite directions, means supported on the frame for reciprocating motion and engaged with said members for rotating the same in opposite directions when reciprocated, an arm pivotally attached to the frame and connected to said means for reciprocating the same responsive to rocking movement of the arm in opposite directions, drive means on the frame including a driving link for rocking the arm, and a resilient yielding connection between the link and arm including an extension of the link, the arm having an apertured bracket in which said extension is supported intermediate its ends for sliding movement, said extension including abutments at opposite sides of and spaced from the bracket, said connection further including compression springs carried by said extension at opposite sides of the bracket between the brackets and the respective abutments, said springs in their uncompressed condition being distinctly shorter than the distance between the bracket and the respective abutments so as to produce lost motion of the driving link in respect to the arm when the driving link is operated to rock the arm, said reciprocating means having a resistance to movement by the arm effective to progressively compress the springs between the bracket and the respective abutments during rocking of the arm in opposite directions following the lost motion of the driving link, said progressive compression of the springs continuing until the compression reaches a value effective to overcome the resistance of the reciprocating means, thus to impart an initially gradual movement to said arm and reciprocating means.

References Cited by the Examiner

UNITED STATES PATENTS

| | | | |
|---|---|---|---|
| 1,864,034 | 6/1932 | Wyland | 88—14.8 |
| 2,587,959 | 3/1952 | Biner | 198—135 |
| 3,019,889 | 2/1962 | Carrier. | |
| 3,032,175 | 5/1962 | Thomas. | |

SAMUEL F. COLEMAN, *Primary Examiner.*

ERNEST A. FALLER, *Examiner.*